Nov. 23, 1926.  
A. L. RUTHVEN  
1,608,185  
SIMPLEX TRAIN CONTROL  
Filed June 4, 1923 5 Sheets-Sheet 1

Inventor  
A. L. RUTHVEN  
By Monroe E. Miller  
Attorney.

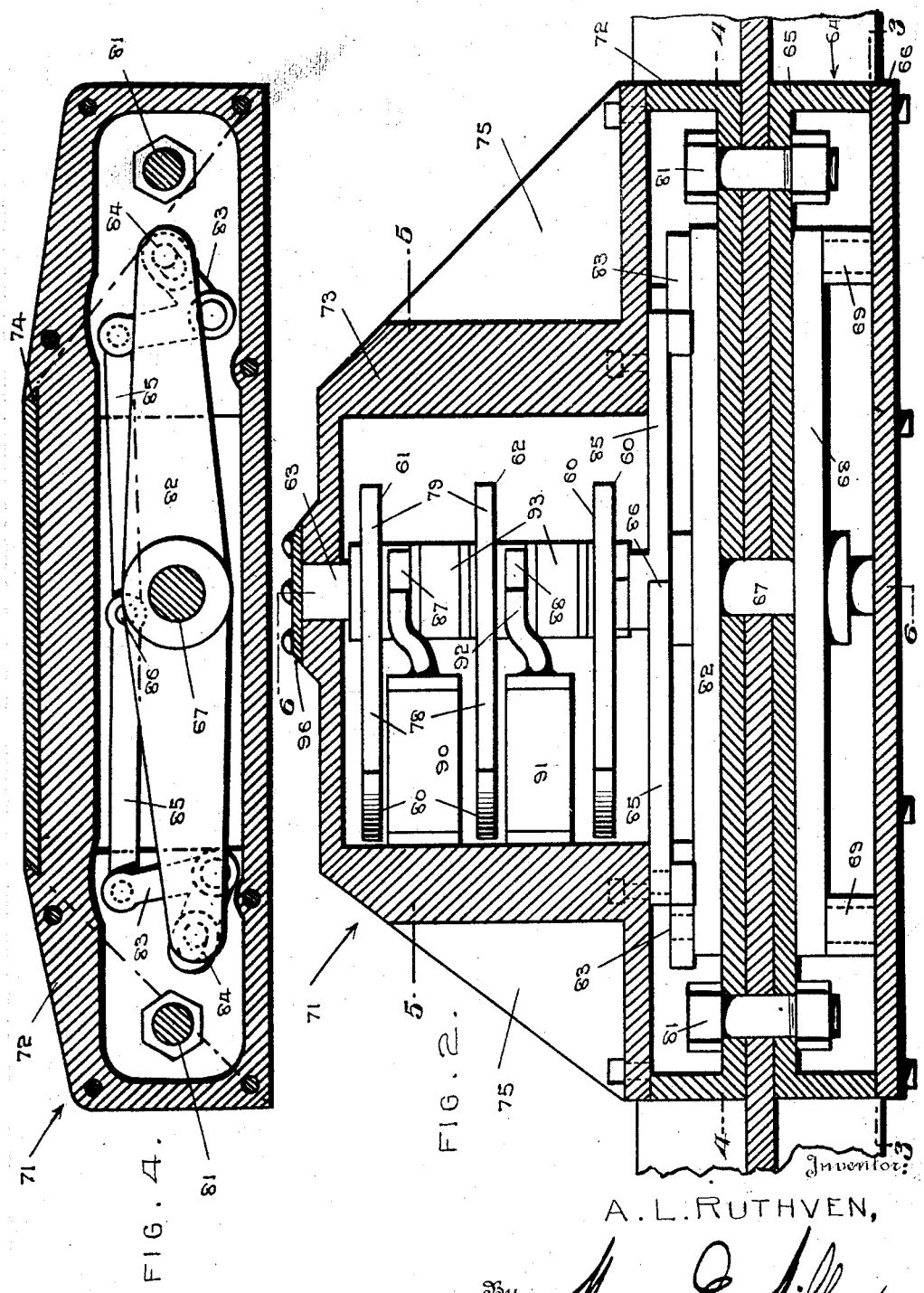

Nov. 23, 1926.                          1,608,185
A. L. RUTHVEN
SIMPLEX TRAIN CONTROL
Filed June 4, 1923      5 Sheets-Sheet 3
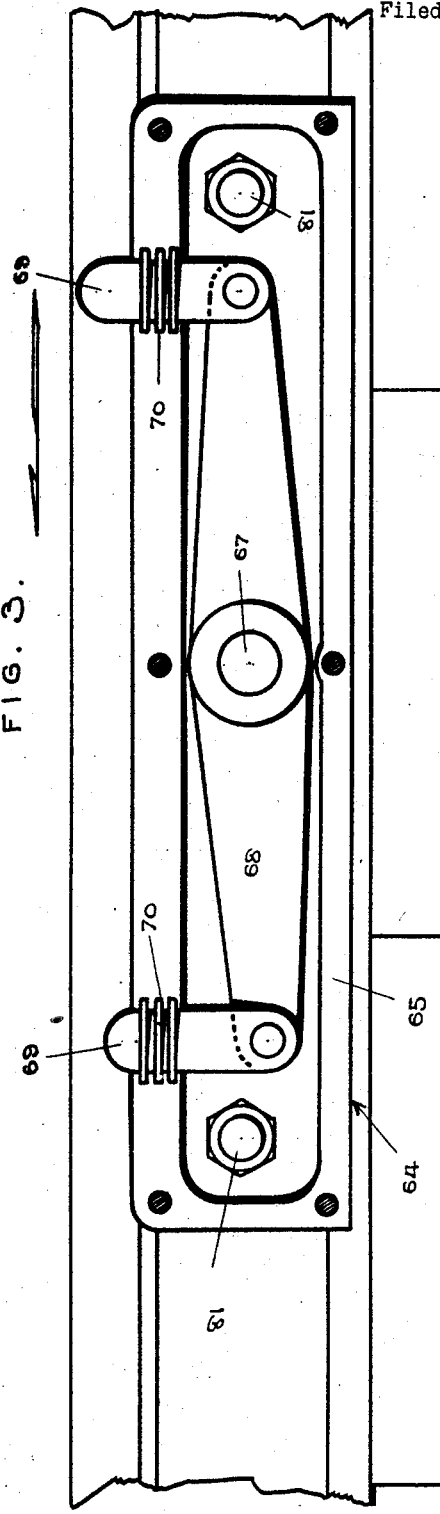
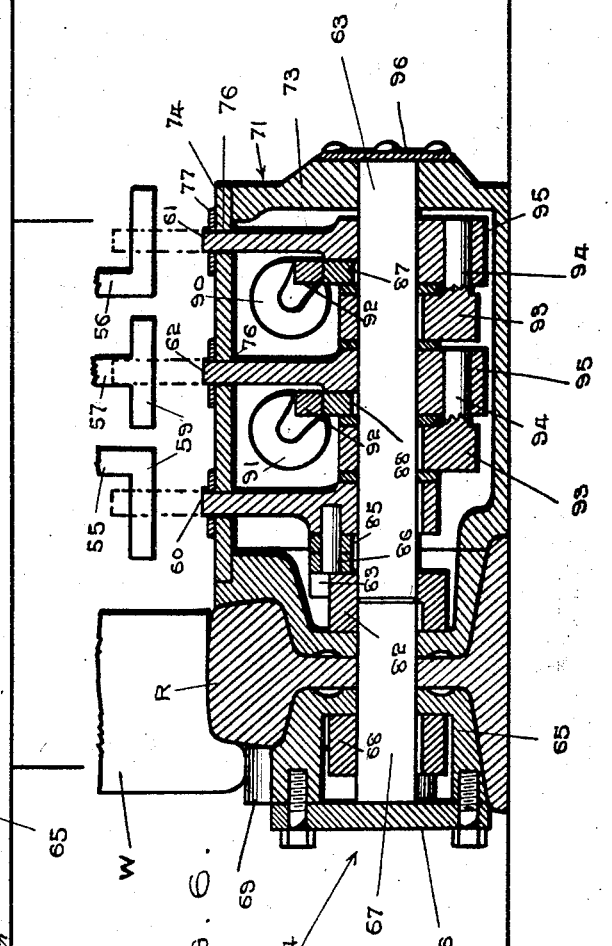
Inventor:
A. L. RUTHVEN,
By
Attorney.

Nov. 23, 1926.  1,608,185
A. L. RUTHVEN
SIMPLEX TRAIN CONTROL
Filed June 4, 1923    5 Sheets-Sheet 4
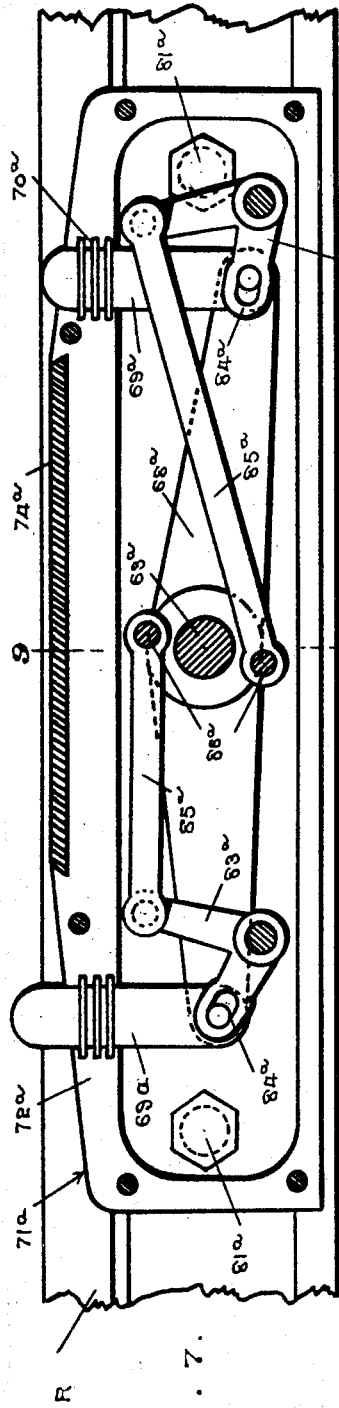
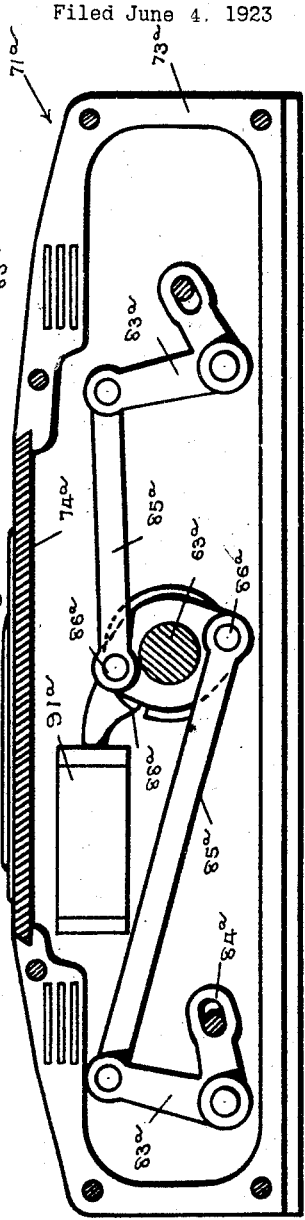
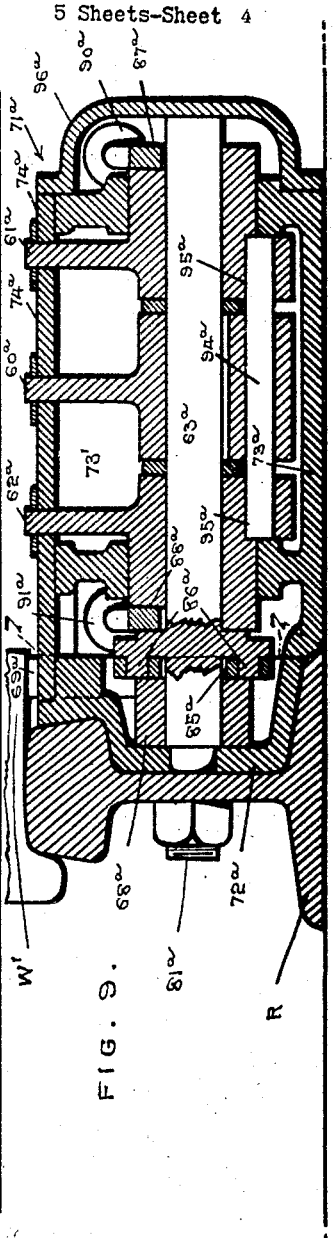
Inventor:
A. L. RUTHVEN,
By Monroe B. Miller
Attorney.

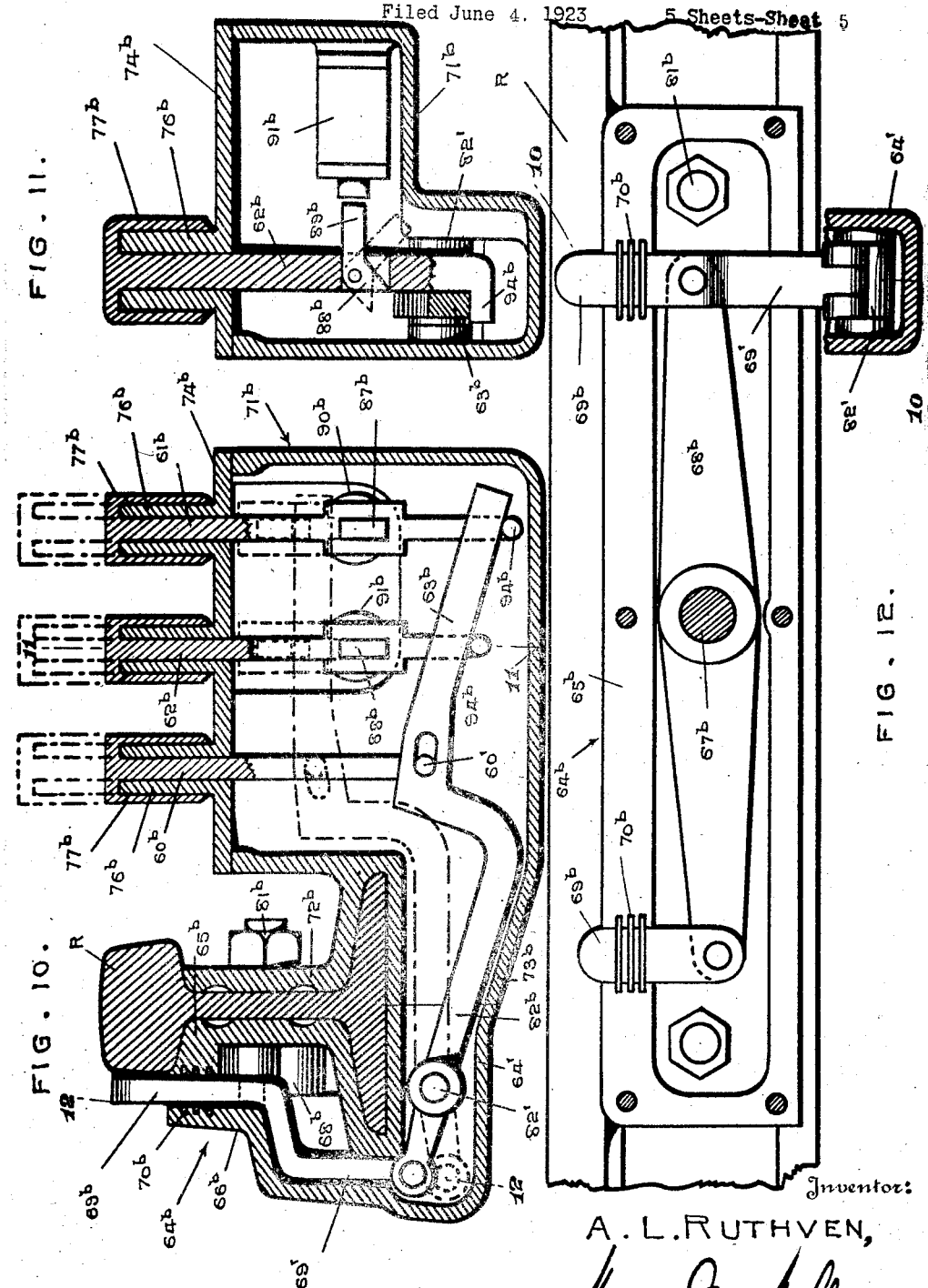

Patented Nov. 23, 1926.

1,608,185

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX TRAIN CONTROL.

Application filed June 4, 1923. Serial No. 643,305.

The present invention relates to train controlling apparatus, and aims to provide novel improvements in such apparatus to enhance the utility and efficiency thereof.

The primary object of the invention is the provision of a novel trip mechanism including cooperable trip members on the track and vehicle, and means controlled by the vehicle-carried trip members for obtaining different conditions of vehicle control in a desirable, efficient and practical manner.

Another object is the provision of such apparatus including trip members for obtaining caution and danger conditions in the vehicle equipment, requiring restricted speed of the vehicle under such conditions, in combination with trip members for clearing the vehicle equipment and removing the speed restriction when the track device at a control station is set accordingly.

A further object is the provision of a novel and improved tripping device to be used on the track and operated by the locomotive or vehicle under the control of the wayside signal apparatus or circuits, whereby the practical and effective operation of the trip mechanism is assured, without being interfered with by ice, sleet, dirt, water or other foreign matter.

A still further object is the provision of a tripping device including novel means for actuating and controlling the tripping members and for mounting them for movement to and from active position.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is an enlarged horizontal section of the tripping device taken on the line 2—2 of Fig. 1, portions being shown in plan.

Figure 5:
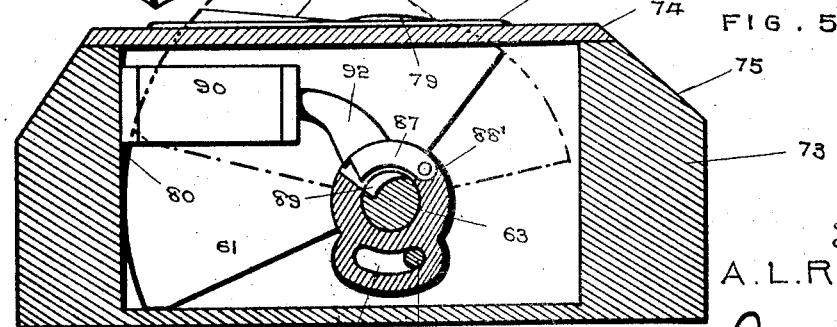

Figs. 3, 4 and 5 are sections on the respective lines 3—3, 4—4 and 5—5 of Fig. 2.

Fig. 6 is a cross section on the line 6—6 of Fig. 2.

Figs. 7 and 8 are vertical sections on the line 7—7 of Fig. 9, looking in opposite directions, and showing details of a modified form of tripping device.

Fig. 9 is a vertical transverse section on the line 9—9 of Fig. 7.

Fig. 10 is a vertical transverse section on the line 10—10 of Fig. 12 illustrating another modified form of tripping device.

Figs. 11 and 12 are vertical sections on the respective lines 11—11 and 12—12 of Fig. 10.

*Normal running circuit.*

The vehicle equipment includes an electromagnet 15 which controls an air valve or other device, so that when said magnet is deenergized the brakes are applied, the steam, electrical or other power shut off, or both, so that such magnet must be kept energized in order that the locomotive or train can proceed. The circuit of the magnet 15 includes a direct current generator 14, or other source of electrical energy, the magnet 15, a movable contact brush or blade 16 carried by a centrifugal speed control governor 17, a conductor 18 which may have a white electric lamp 19 therein for indicating clear conditions when the lamp is lighted, a switch 20, a conductor 21, a switch 22, and conductor 27. The opening of any switch will open the circuit, as well as the accidental breaking or shorting of the circuit, to deenergize the magnet 15 and apply the brakes.

Switches 20 and 22 are carried by and insulated from the respective switches 28 and 29 under the influence of the corresponding electromagnets 30 and 31, which, when energized, hold said switches closed.

The magnet 30 is in a normally closed circuit including the generator 14, conductor 27, a switch 32, conductor 33, magnet 30, switch 28 and conductor 34, and the opening of the switch 32 will open such circuit so as to deenergize the magnet 30. This will permit the switches 20 and 28 to drop open, and the switch 28 having been released cannot be reclosed unless the circuit of the magnet 30 is completed through some other channel. The switch 20 being opened will establish caution conditions, as will hereinafter more fully appear.

The magnet 31 is also in a normally closed circuit including the generator 14, conductor 27, switch 35, conductor 36, magnet 31, switch 29 and conductor 34, whereby the opening of the switch 35 will deenergize the magnet 31 and permit the switches 22 and 29 to drop open. The switch 29 having moved open will prevent the switch from being reclosed unless the circuit of the magnet 31 is completed through some other connection, thereby keeping the switch 22 open, which obtains danger vehicle conditions, as will hereinafter more fully appear.

*Caution speed control circuit.*

The deenergization of the caution magnet 30 and opening of the caution switch 20 will produce caution conditions in the vehicle equipment, with the switch 22 closed. Under these conditions, the circuit of the magnet 15 includes a speed control shunt parallelling the switch 20. The circuit of the magnet 15 now includes the generator 14, magnet 15, brush 16, a caution contact strip 37 arranged to be engaged by the brush 16 when the vehicle is travelling below a predetermined speed (say from fifteen to thirty miles an hour), conductor 38 which may include a green or yellow electric lamp 39 for indicating caution conditions when lighted, conductor 21 (conductor 18 and switch 20 being shunted by the contact strip 37 and conductor 38), switch 22, and conductor 27. The strip 37 is of such a length that the brush 16 will be removed therefrom, to open such caution control circuit, when the allotted speed is exceeded, thereby deenergizing the magnet 15 to apply the brakes. Caution speed control therefore obtains when the switch 20 is open, compelling the completion of the circuit by way of the caution control contact strip 37 of the speed control device. The governor 17 is operated from a wheel or other movable member, for rotating the governor according to the speed of the vehicle, and for raising the brush 16 in accordance with the speed. If the speed of the vehicle, under such caution conditions, is exceeded, the brush 16 will be lifted off the contact strip 37 so as to open the circuit of the magnet 15 and to apply the brakes until the speed is reduced and the brush 16 is returned to the strip 37.

*Danger speed control circuit.*

A more reduced speed is required under danger conditions than under caution conditions, and the train must first be brought to a stop before it can proceed, after a danger indication is received by the vehicle equipment, this being brought about by the opening of the switch 22, which will enforce danger speed control until the switch 22 is again closed. The danger speed control circuit shunts the conductor 18 and switches 20 and 22, and also shunts the contact strip 37 and conductor 38 of the caution speed control circuit. Such danger speed control circuit includes the generator 14, magnet 15, brush 16, a contact 40 engaged by the brush 16 when the vehicle has come to a complete stop, conductor 41, switch 43, an electromagnet 44, conductor 45, engineer's or motorman's switch 46, conductor 47 and conductor 27. Thus, when the vehicle has come to a stop, with the brush 16 engaging the contact 40, and the engineer or motorman holds the switch 46 closed, the circuit of the magnet 15 is completed, to reenergize the magnet 15 and release the brakes. The magnet 44 is also energized, thereby attracting the switch 43 and moving the switch against the contact 48 to change the circuit connections and permit the train to proceed at a slow speed under danger conditions. The danger speed control circuit, after the lifting of the switch 43, now includes the generator 14, magnet 15, brush 16, a danger speed control contact strip 49, which is shorter than the contact strip 37 to restrict the speed to twelve miles per hour or less, conductor 50 which may include a red danger electric lamp 51 to indicate danger conditions when the lamp is lighted, contact 48, switch 43, magnet 44, conductor 45, switch 46 held closed, conductor 47 and conductor 27. The vehicle can then proceed below the maximum danger speed, the brush 16 sliding upward on the strip 49, and if such speed is exceeded, the brush 16 is removed from the strip 49, which will not only deenergize the magnet 15 and apply the brakes, but which will also deenergize the magnet 44, letting the switch 43 drop away from the contact 48. This will open the circuit through the contact strip 49, thereby keeping the brakes applied until the train is again brought to a stop to return the brush 16 against the contact 40, in which event the switch 43 is again lifted into connection with the contact 48 so that the vehicle can proceed again under danger speed control. A stop will be enforced, however, whenever the danger speed is exceeded under these conditions.

An electric lamp 51' is disposed in the conductor 41, and other signal devices can be used in lieu of the electric lamps, for giving visual or audible signals, or both. The lamp or signal device 51' is provided for the purpose of giving a signal if the governor 17 is not operating when proceeding under danger speed control, such as in the event that the driving connection with the governor becomes broken. Thus, when a danger signal is received and the train is brought to a stop to move the brush 16 against the contact 40, the circuit through the magnets 15 and 44 is completed, to release the brakes and raise the switch 43 against the contact 48, thereby bringing the danger contact strip 49 into the circuit, and also leaving the contact 40 in the circuit, so that both the lamps 51 and 51' are lighted under these conditions, with the train stopped, it being understood that the switch 46 is held closed. Now, if the train is started and the governor 17 is not operating, the brush 16 will remain on the contact 40, and the lamp 51' will remain lighted or other signal provided, to immediately warn the engineer that the governor is out of commission, it being noted that if the governor is not operating the brush 16 will not be removed from the strip 49 even though the danger speed is exceeded. The governor can also be arranged in full view of the engineer so that he may see same while operating, to be assured that the governor is in working condition when the train is moving.

The danger speed control prevails whenever the switch 22 is opened, compelling the completion of the circuit of the magnet 15 by way of either the contact 40 or contact strip 49, the path for the current through the conductors 18 and 39 being cut off.

The speed permitted under danger conditions is sufficiently slow to enable a quick stop to be made, but the train can proceed, should the apparatus be out of commission or other contingency exist, for otherwise the train might be locked against any advance movement with the brakes set.

Clearing device.

The speed control of the vehicle is terminated when the vehicle passes the track element or device set for clear, and the clearing device includes a switch 52 to which the conductor 34 is connected, and the switch when moved in either direction from neutral or normal position will engage the corresponding contacts 53 of two pairs of contacts, and said two pairs of contacts are connected by separate conductors 54 with the magnets 30 and 31 between said magnets and switches 28 and 29, respectively.

The clearing switch 52 shunts the switches 28 and 29, so that the magnets 30 and 31 can be energized, providing the switches 32 and 35 are closed.

Thus, with the switch 52 against one contact 53 of either pair, the clearing circuit of the magnet 30 includes the generator 14, conductor 27, switch 32, conductor 33, magnet 30, corresponding conductor 54, corresponding contact 53, switch 52 and conductor 34, but if the switch 32 is open, the magnet 30 will not be reenergized.

The clearing circuit of the magnet 31 includes the generator 14, conductor 27, switch 35, conductor 36, magnet 31, corresponding conductor 54, corresponding contact 53, switch 52, and conductor 34, requiring the switch 35 to be closed.

Responsive devices.

Figure 1:
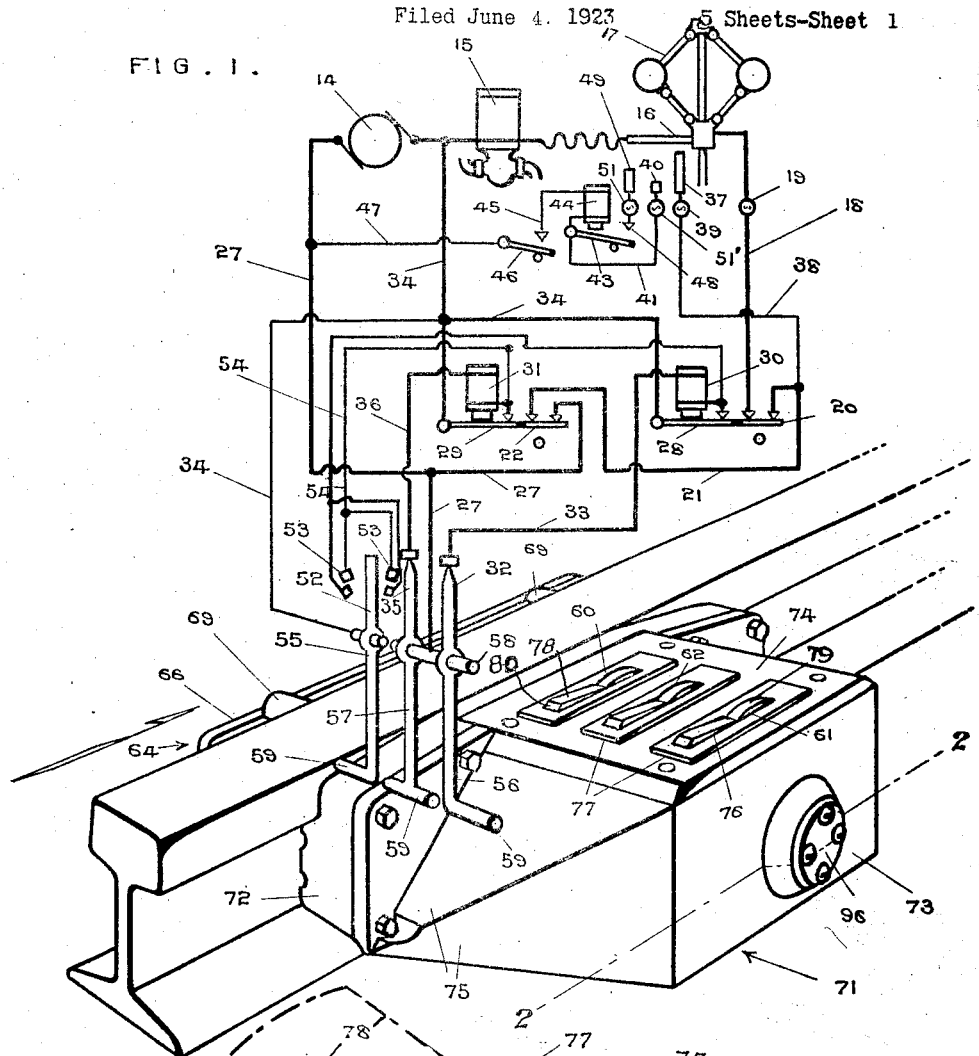
Figure 1 illustrates in perspective the tripping device of the track, and illustrates in diagram the vehicle equipment.

The switches 32, 35 and 52 are operated from the track element or device. As shown in Fig. 1, the switches 32, 35 and 52 are carried by the trip members 56, 57 and 55, respectively, which are pendulums so as to be capable of swinging forwardly and rearwardly about a transverse axis. The trip members or pendulums 56 and 57 can be mounted for turning movement on a common axle or fulcrum 58 to which the conductor 27 is connected, and the member or pendulum 55 is also supported for oscillating motion in any suitable manner. The members 55, 56 and 57 are weighted or spring influenced so as to remain in neutral position unless displaced by contact with the tripping members of the track device. The lower ends of the members or arms 55, 56 and 57 have the heads 59 to contact with the respective tripping members 60, 61 and 62 of the track device.

The responsive devices thus constitute, with extreme simplicity, trip members to be operated by the tripping device on the track for tripping or operating the switches 32, 35 and 52. The trip members 55, 56 and 57 are suspended or supported from the locomotive or vehicle in any suitable manner to pass over the tripping devices on the track.

Track element or tripping device.

The track element for controlling the responsive elements or members carried by the vehicle constitutes a tripping device for tripping the members 55, 56 and 57 of the vehicle equipment. The tripping members 60, 61 and 62 are a part of the tripping device, and are mounted on a transverse rock shaft 63, which is actuated by the locomotive or vehicle passing the control station, it being understood that one of the tripping devices is located at each control station.

The actuating means for the tripping device includes a case or housing 64 disposed against and shaped to fit the inner side of the rail R, and said case comprises a recessed section 65 fitting the inner side of the rail, and a plate or section 66 secured removably to the section 65. A rock shaft 67 is journaled through an opening in the section 65 of the case 64 and projects through an opening in the web of the rail, and a walking beam or lever 68 is keyed or otherwise secured on the rock shaft 67 within the recess of the case section 65. Plungers 69 are pivoted to the opposite ends of the walking beam or lever 68 and pass slidably through the top of the case 64. The top of the case has packing 70 around the plungers 69 to prevent water and moisture entering the case, and the case can also contain oil or grease to keep the parts lubricated and to exclude moisture and water. The plungers 69 project upwardly above the case at the inner side of the tread or head of the rail, to be alternately depressed by the flanges of the wheels, so as to oscillate the lever 68 and the shaft 67.

The tripping members 60, 61 and 62 are mounted within a case 71 disposed at the outer side of the rail opposite to the case 64, and the case 71 comprises a recessed section 72 disposed against and shaped to fit the outer side of the rail, and said case 71 also includes the hollow section 73 detachably secured to the section 72, with a removable cover or top 74. The case section 73 has surfaces 75 converging or slanting to the opposite ends of the case 71 so as to deflect objects over or across the outer side of the case 71, should objects be trailing or dangling from trains passing the tripping device, thus preventing the case 71 from being torn loose or damaged.

The tripping members 60, 61 and 62 comprise flat plates disposed within the case 71 in transversely spaced vertical planes parallel with the rail, and said tripping members work through parallel longitudinal slots 76 in the top 74 of the case. Slotted weather strips 77 of fibre or other suitable material are secured on the top 74 of the case 71 above the slots 76 and fit snugly around the tripping members to prevent water, moisture, dirt and other foreign matter from passing down through the slots into said case. The tripping members remain in snug engagement with the edges and ends of the slots in the different positions of said members, so as not to leave openings between the tripping members and case. Thus, the tripping members have the upper edges 78 which lie close to or substantially flush with the top of the case 71 when the tripping members are retracted or moved downwardly to idle position, and said members have the curved edges 79 and 80 which are curved around the axis of the shaft 63 whereby said edges 79 and 80 remain in snug contact with the ends of the slots 76 and weather or packing strips 77 when the tripping members are turned to projected and retracted positions. When the tripping members are swung upwardly, as seen in dot and dash lines in Fig. 5, the corners of the tripping members between the edges 78 and 80 project above the top of the case, with the edges 78 inclined in one direction and the edges 80 inclined in the opposite direction. The tripping members being forcibly raised will break through ice and snow that may have accumulated on the case 71 so that the operation of the tripping device will not be interfered with.

The two cases 64 and 71 are secured to the opposite sides of the rail by means of bolts 81 or other securing elements extending through the sections 65 and 72 and through the web of the rail, preferably beyond the ends of the walking beam or lever 68.

The rock shaft 63 is oscillated from the rock shaft 67 and through a larger angle, in order that the tripping members will be turned the proper amount even though the lever 68 and shaft 67 have only a small turning movement. A walking beam or lever 82 corresponding with the lever 68 is disposed within the recess of the section 72 of the case 71, and is keyed or otherwise secured on the outer end of the shaft 67, and said lever 82 can also receive the corresponding end of the shaft 63 to provide a bearing therefor. The lever 82 thus oscillates with the lever 68 as a unit. Bell crank levers 83 are fulcrumed at their elbows in the section 72 near the ends of the lever 82, and have pin and slot or other connections 84 with the ends of said lever 82, whereby the levers 83 turn through larger angles than the lever 82. The levers 83 are connected by links 85 with a pivot pin 86 carried by the tripping member 60, and said tripping member is keyed or otherwise secured to the rock shaft 63, whereby said rock shaft 63 is oscillated through a larger angle than the shaft 67.

The case 71, like the case 64, can contain lubricant for keeping the parts lubricated, as well as to exclude rain and moisture from the working parts in the case.

The tripping member 60 is secured to the shaft 63 to be oscillated with said shaft so as to trip the trip member or lever 55, when the train passes a control station, to clear the vehicle equipment or to terminate the speed control, providing that a caution or a danger condition is not established or maintained. The tripping member 61 when raised or projected will trip the member or lever 56, in order to produce a caution condition in the vehicle equipment, whereas the tripping member 62 when raised will trip the member or lever 57 to produce a danger condition.

The caution and danger tripping members 61 and 62 are mounted loosely on the shaft 63, and means are provided for connecting said tripping members with the shaft, controlled from the semaphore or wayside signal apparatus, whereby the tripping member 61 is raised by the shaft 63 for caution track conditions, while the tripping member 62 is raised for danger track conditions. Dogs or pawls 87 and 88 are pivoted to the hubs of the tripping members 61 and 62, respectively, to drop by gravity into notches 89 provided in the shaft 63, whereby said tripping members will turn with the shaft when said dogs are released. The hubs of said tripping members have abutments 88' against which the dogs abut, to relieve the pivots of shearing strain, and when the dogs are released so as to drop into the notches 89, they are disposed between the abutments 88' of the tripping members and the shoulders or abutments of the notches, so as to assure of the tripping members being turned with said shaft. The dogs 87 and 88 are raised and held in releasing position, under clear conditions, to prevent the caution and danger tripping members from being raised when the shaft 63 is turned. Thus, electromagnets 90 and 91 are mounted in the case 71 and their cores 92 extend over the dogs 87 and 88, respectively, for raising said dogs by attraction to the cores 92. Both magnets 90 and 91 are disposed in the corresponding circuits of the wayside signal apparatus, in order that both magnets are energized under clear traffic conditions; the magnet 90 being deenergized and the magnet 91 energized for caution speed conditions, so that the dog 87 drops to turn the caution tripping member 61 with the shaft 63; and the magnet 91 being deenergized for danger conditions so that the dog 88 drops into engagement with the shaft 63 to turn the danger tripping member 62 with said shaft when danger track conditions exist.

In order to retract the tripping members 61 and 62 into the case 71 when the shaft 63 is turned backwardly, collars or arms 93 are keyed or otherwise secured on the shaft 63 and have the pins or fingers 94 working in the slots 95 provided in the hubs of the tripping members 61 and 62. Said pins 94 can move in the slots 95 with the tripping members in normal or idle position, when the shaft 63 is oscillated, and when either tripping member 61 or 62 is raised, the pin 94 in moving backwardly with the shaft 63 will swing the tripping member back or down to idle position.

As shown, the inner end of the shaft 63 is journaled in the lever 82, and the outer end of said shaft is journaled in the outer wall of the case 71, and a cap plate 96 is secured to said outer wall across the end of the shaft.

*Operation.*

*Clear conditions.*—With the train proceeding under clear conditions between or beyond the control stations, the normal running circuit is closed so as to keep the magnet 15 energized, such circuit including the generator 14, magnet 15, brush 16, conductor 18, switch 20, conductor 21, switch 22 and conductor 27. The lamp 19 is also lighted to indicate clear conditions. The magnet 30 is kept energized to hold the switches 28 and 20 closed, by being included in the circuit including the generator 14, conductor 27, switch 32, conductor 33, magnet 30, switch 28 and conductor 34. The magnet 31 is kept energized to hold the switches 29 and 22 closed, by being in the circuit including the generator 14, conductor 27, switch 35, conductor 36, magnet 31, switch 29 and conductor 34.

Under clear track conditions, both magnets 90 and 91 of the tripping device are energized so as to hold the dogs 87 and 88 in raised or releasing position.

The trip members 55, 56 and 57 of the vehicle are carried by the vehicle at one side of or adjacent to a wheel of the vehicle or locomotive, as seen in Fig. 6, whereby the trip members are properly cooperable with the tripping device on the track when the tripping device is operated by such wheel.

Now, when the corresponding wheel of the vehicle moves past the tripping device, the flange of the wheel will depress the first plunger 69, which is normally in raised position, thereby rocking the lever 68 and shaft 67 (clock-wise as seen in Fig. 3), so that the shaft 63 is turned in the same direction through a greater angle, but the dogs 87 and 88 being held in raised position, will prevent the tripping members 61 and 62 from being raised. However, the tripping member 60 turns with the shaft 63, so that the tripping member 60 is raised in front of the clearing trip member 55, to trip said member so as to close the switch 52 for an instant, to terminate the speed control, if it exists, as will hereinafter more fully appear. Then, when the trip members have passed the tripping members, the wheel then passes over and depresses the second plunger 69, which was raised when the first plunger 69 was depressed, thereby turning the shafts 67 and 63 reversely, and retracting the tripping member 60, so that the tripping members are left in retracted position out of the way after the wheel passes the tripping device.

In the arrangement as shown, using the actuating plungers 69 at the inner side of the rail, the tripping device is oscillated by each wheel of the train, and the last wheel passing over will leave the second plunger 69 in depressed position, so that the tripping device is left with the tripping members down, and they will not constitute obstructions projecting above the plane of the treads of the rails.

*Caution conditions.*—Under caution track conditions, the magnet 90 is deenergized and the magnet 91 remains energized, so that the dog 88 is held raised, while the dog 87 drops into the corresponding notch of the shaft 63.

Then, when the vehicle passes the tripping device, so that the corresponding wheel depresses the first plunger 69 to turn the shaft 63, the tripping member 60 is not only raised, but the tripping member 61 is also raised by the closing of the dog or clutch member 87 between the shaft 63 and tripping member 61. The trip member 56 is therefore tripped or swung by the tripping member 61, to open the switch 32, and the tripping members are retracted when the wheel passes over the second plunger 69 after the tripping action occurs.

The opening of the switch 32 will immediately deenergize the magnet 30 to release the switch 28, so that the switches 20 and 28 are opened, thereby opening the normal running circuit at the switch 20 and establishing the caution speed control circuit.

The caution speed control circuit includes the generator 14, magnet 15, brush 16, contact strip 37, conductor 38, conductor 21, switch 22, and conductor 27, the conductor 18 and switch 20 being shunted by the contact strip 37 and conductor 38. Should the train be moving above caution speed with the brush 16 above the contact strip 37, the magnet 15 will be deenergized to reduce the speed, and when the brush 16 engages the contact strip 37, the magnet 15 will be reenergized so that the train can proceed under caution speed but not above such speed. Should the speed allotted be exceeded, the brush 16 being removed from the strip 37 will immediately open the circuit of the magnet 15 and apply the brakes, thereby compelling obedience to the caution conditions.

Caution speed control is continued through the block, after passing the control station set for caution conditions, and when the magnet 30 has been deenergized, the switches 20 and 28 will remain open until the vehicle passes a tripping device set for clear conditions.

*Danger conditions.*—When danger track conditions exist, the magnet 91 is deenergized and the magnet 90 is also preferably deenergized.

Thus, when the train passes the control station, the first plunger 69 being depressed will raise the tripping member 62 with the tripping member 60, the dog 88 having been dropped into engagement with the shaft 63, and the trip member 57 is therefore swung or tripped by the member 62, to open the switch 35. This will immediately deenergize the magnet 31 and release the switches 22 and 29 so that they move or drop open. Said switches remain open to continue the danger speed control until terminated by a clearing action.

The danger speed control circuit is established by the opening of the switch 22, whether or not the switch 28 has been opened, and such circuit includes the generator 14, magnet 15, brush 16, contact 40, conductor 41, magnet 44, conductor 45, switch 46, conductor 47 and conductor 27. Two requirements are therefore necessary. First, the train must be brought to a stop in order that the brush 16 will engage the contact 40, and, second, the engineer or motorman must close the switch 46, before the brakes will be released, after the switch 22 has been opened by the danger impulse or signal. It will be noted that the switch 22 is disposed in the normal running and caution speed circuits, requiring the completion of the circuit of the magnet 15, under danger conditions, through the switch 46 and conductor 47. When the train has been brought to a stop and the switch 46 is closed, said preliminary danger speed control circuit is closed, thereby energizing the magnet 15, to release the brakes, and the magnet 44 is also energized to raise the switch 43 against the contact 48, thereby changing the circuit connections to include the danger contact strip 49. As a result, the train can proceed under restricted danger speed, as long as the brush 16 remains on the strip 49, but when proceeding under danger conditions, the engineer or operator must keep the switch 46 closed so as to assure that he is alert. If the permissible danger speed is exceeded, the brush 16 being removed from the strip 49 will deenergize the magnet 15 to apply the brakes, and the magnet 44 being deenergized will let the switch 43 drop, thereby disconnecting the strip 49 from the circuit, so that the train must again be brought to a stop before it can proceed further, as before. The danger speed is thus enforced, with a penalty in the stopping of the train if the speed is exceeded. The danger lamp 51 is lighted while proceeding under danger speed control, and the lamp 51' is lighted when the train is at rest and the governor at a stand still.

*Speed control termination.*

When the train is proceeding under either caution or danger speed control and it passes a control station set for clear, the vehicle equipment is brought to clear condition, for terminating speed control, and the danger speed control is also terminated when the control station is set for caution, so that the vehicle equipment can step up from danger to caution speed control.

Thus, when the vehicle passes a tripping device set for clear, with the dogs 87 and 88 raised, the tripping member 60 is raised, while the tripping members 61 and 62 remain down, so that the trip member or lever 55 is swung to close the switch 52 for an instant. Now, if the switches 32 and 35 remain closed then a clearing action takes place to reenergize either or both of the magnets 30 and 31. The switch 52 being closed will establish a clearing circuit including the generator 14, conductor 27, switch 32, conductor 33, magnet 30, corresponding conductor 54, corresponding contact 53, switch 52 and conductor 34, so that the magnet 30 is energized to raise the switch 28 and restore the caution relay to normal position. However, switch 32 must remain closed, and if the tripping member 61 is raised to trip the member 56, then the switch 32 is opened and the magnet 30 is deenergized, or if said magnet is already deenergized it will not be reenergized by the closing of the switch 52. Another clearing circuit includes the generator 14, conductor 27, switch 35, conductor 36, magnet 31, corresponding conductor 54, corresponding contact 53, switch 52 and conductor 34, to reenergize the magnet 31 and raise the switches 22 and 29. However, the switch 35 must remain closed, and if the member 57 is tripped by the tripping member 62, the magnet 31 will not be energized.

Accordingly, with both tripping members 61 and 62 down, the tripping of the member 55 will result in both magnets 30 and 31 being reenergized to restore the normal running circuit. Should the caution tripping member 61 be up to trip the member 56 and open the switch 32, the magnet 30 will not be energized, but if the train is proceeding under danger speed control with the magnet 31 deenergized, the switch 35 remaining closed will result in the clearing circuit through the magnet 31 being closed by the switch 52, to raise the switches 22 and 29, thus eliminating the danger speed control, although the caution speed control obtains by the deenergization of the magnet 30. This enables the speed of the train to be increased from danger speed to caution speed, to avoid unnecessary retarded speed in a caution block after travelling in a danger block.

Modifications.

Figs. 7, 8 and 9 illustrate a modified form of tripping device in which the actuating means as well as the tripping members are located at the outer side of the rail. The case 71$^a$ has the section 72$^a$ to fit and bear against the outer side of the rail, being secured to the rail by the bolts 81$^a$, and said case has the section 73$^a$ containing the chamber 73' in which the tripping members 60$^a$, 61$^a$ and 62$^a$ are located. In this arrangement, the clearing tripping member 60$^a$ is located between the caution tripping member 61$^a$ and danger tripping member 62$^a$, and said tripping members work through slots in the top 74$^a$ of the case. The hubs of the tripping members 61$^a$ and 62$^a$ are journaled and extended through the outer and inner walls of the section 73$^a$ of the case, and the hub of the tripping member 60$^a$ is secured on the shaft 63$^a$. The pin 94$^a$ extends through or is secured to the hub of the tripping member 60$^a$ and projects into the slots 95$^a$ in the hubs of the caution and danger tripping members for returning the last-named tripping members downwardly with the tripping member 60$^a$. The dogs 87$^a$ and 88$^a$ of the tripping members 61$^a$ and 62$^a$ are located at the opposite sides of the section 73$^a$ of the case, so as not to be located in the chamber 73', and such chamber can therefore contain a thick grease, to exclude moisture and water from said chamber. The grease is confined to the chamber 73' so as not to interfere with the dogs 87$^a$ and 88$^a$ which are controlled by the respective electromagnets 90$^a$ and 91$^a$. A cap 96$^a$ is secured to the outer side of the case 71$^a$ to enclose the dog 87$^a$, magnet 90$^a$ and outer end of the shaft 63$^a$, while the dog 88$^a$ and 91$^a$ are housed between the sections 72$^a$ and 73$^a$.

The shaft 63$^a$ is journaled in the hubs of the tripping members 61$^a$ and 62$^a$ which are in turn journaled in the case, and the inner end of the shaft 63$^a$ is also journaled in the section 72$^a$ of the case.

The plungers 69$^a$ are located at the outer side of the rail and project slidably upward through the top of the case. The section 72$^a$ contains packing 70$^a$ through which the plungers pass, and the lower ends of the plungers are pivoted, as at 84$^a$, to the opposite ends of the walking beam or lever 68$^a$ which is mounted for oscillation on the shaft 63$^a$. The lever 68$^a$ takes the place of the two levers 68 and 82 of the first form of tripping device, and the lever 68$^a$ is located within the section 72$^a$ of the case 71$^a$. The bell crank levers 83$^a$ are fulcrumed in the section 72$^a$ of the case and engage the pivots 84$^a$ to be oscillated by the lever 68$^a$, the bell crank levers being so arranged, as seen in Figs. 7 and 8, to oscillate in opposite directions. The levers 83$^a$ are connected by the links 85$^a$ with the pins 86$^a$ carried by the shaft 63$^a$, whereby the shaft 63$^a$ is oscillated by the depression of first and second plungers 69$^a$ in succession.

In order to operate the plungers 69$^a$, a wheel of the vehicle or locomotive adjacent to which the trip members 55, 56 and 57 are located, is provided with a wider tread or rim than usual, so that the tread or rim projects outwardly beyond the rail, as seen at W' in Fig. 9, so that the tripping device is only operated by such wheel for cooperation with the trip members carried by the vehicle. Instead of the tripping device being operated by the wheel W', the plungers 69$^a$ can be depressed by a shoe driving on the rail as indicated at W' in Fig. 9.

In the second form of tripping device, the chamber 73' can be filled with grease so as to preclude the entrance of water in the slots in the top of the casing to interfere with the working parts by the rusting thereof or the freezing of water in the case, and the dogs 87ª and 88ª are located in other chambers or spaces in which a thin oil can contained, if desired, to lubricate the parts without interfering with the movement of said dogs. The chambers or spaces in which the dogs are located are closed tightly from the atmosphere so that water and moisture cannot enter.

Another variation of the track control device is shown in Figs. 10, 11 and 12. The case 64$^b$ is disposed at the inner side of the rail, and comprises the recessed section 65$^b$ fitting the rail, and the cover or side plate 66$^b$. The walking beam or lever 68$^b$ is fulcrumed, as at 67$^b$, in the case 64$^b$, and the plungers 69$^b$ are pivoted to the ends of said lever and slide through the packings 70$^b$ in the top of said case, so that said plungers are depressed by the wheel flanges.

The tripping members comprise the rods 60$^b$, 61$^b$ and 62$^b$ slidable through the cover or top 74$^b$ of the case 71$^b$, and said top or cover has the upstanding bosses 76$^b$ to prevent water and moisture running down through the apertures. Caps 77$^b$ are secured on the upper ends of the rods and fit slidably over the bosses 76$^b$, to close the apertures or openings, so that said caps shed rain and snow away from the openings, with the rods either raised or lowered. Thus, moisture and water are excluded from the case 71$^b$, and even though ice and snow may accumulate on or above the tripping members, they can be readily raised, by lifting or breaking through the ice or snow.

The case 71$^b$ has in the angular flange 72$^b$ to fit against the outer side of the rail, and flange 72$^b$ and section 65$^b$ of the case 64$^b$ are secured to the opposite sides of the rail by the bolts 81$^b$. The cases 64$^b$ and 71$^b$ have the extensions 64' and 73$^b$, respectively, extending under the rail and registering with one another to accommodate the lever 82$^b$ which extends under the rail. Said lever is fulcrumed, as at 82', in the extension 64', near the corresponding end of the lever, below the first plunger 69$^b$, and said plunger has a downwardly projecting offset portion 69' pivoted to the short arm of the lever, whereby the depression of the first plunger will raise the long arm 63$^b$ of said lever, whereas the depression of the second plunger will swing the long arm of the lever down.

The tripping member or rod 60$^b$ has a pin and slot connection 60' or other suitable connection with the long arm 63$^b$ of the lever, so that the clearing tripping member 60$^b$ is raised and lowered with the lever.

The dogs 87$^b$ and 88$^b$ are pivotally mounted in the tripping members or rods 61$^b$ and 62$^b$, respectively, and have the armatures 89$^b$, to be attracted by the corresponding electromagnets 90$^b$ and 91$^b$ for retracting said dogs out of the path of the arm 63$^b$, so that said arm can be raised without raising the caution and danger tripping members 61$^b$ and 62$^b$. The rods or members 61$^b$ and 62$^b$ have lugs 94$^b$ at their lower ends for the contact of the arm 63$^b$ when it swings downwardly, to retract either or both of said tripping members.

The first plunger being depressed by the wheel, will raise the arm 63$^b$, and the wheel passing over the second plunger will depress said arm. The clearing tripping member 60$^b$ is raised and lowered with the arm 63$^b$, and if the magnet 90$^b$ is deenergized, the dog 87$^b$ swings by gravity into the path of the arm 93$^b$ to raise the tripping member or rod 61$^b$ with the arm 63$^b$ to actuate the caution trip member of the vehicle, whereas if the magnet 91$^b$ is deenergized the dog 88$^b$ swings by gravity into the path of the arm 63$^b$, to raise the tripping member or rod 62$^b$ for operating the danger trip member of the vehicle.

Having thus described the invention, what is claimed as new is:—

1. Vehicle controlling apparatus embodying, in a vehicle equipment, a movable track responsive device, means for establishing a retarded speed condition whenever said device is moved from normal position, and track responsive means operable independently of the movement of said device for terminating said condition and rendered ineffective when said device is moved from normal position.

2. Vehicle controlling apparatus embodying, in a vehicle equipment, a track responsive switch, electrical means for establishing a retarded speed condition whenever said switch is opened, and track responsive means operable independently of said switch for terminating such condition and rendered ineffective when said switch is opened.

3. Vehicle controlling apparatus embodying, in a vehicle equipment, a track responsive switch, electrical means in circuit with said switch to be deenergized whenever said switch is opened, for establishing and maintaining a retarded speed condition, and track responsive means operable independently of said switch for energizing said electrical means to terminate such condition and rendered ineffective when said switch is opened.

4. Vehicle controlling apparatus embodying, in a vehicle equipment, a track responsive normally closed switch, electrical means in circuit with said switch to be deenergized whenever said switch is opened for establishing and maintaining a retarded speed condition, and a track responsive normally open switch operable independently of the first named switch and connected in circuit with the first named switch and said electrical means to energize said electrical means for terminating such condition when the secondnamed switch is closed and rendered ineffective when the first named switch is opened.

5. Vehicle controlling apparatus embodying, in a vehicle equipment, a movable responsive device, means for establishing a retarded speed condition whenever said device is moved from normal position, and responsive means operable independently of said device for terminating such condition and rendered ineffective when said device is moved from normal position, in combination with a control device at each control station of the track including means for operating said responsive means whenever passing the control station and other controlled means for moving said responsive device.

6. Vehicle controlling apparatus embodying, in a vehicle equipment, a responsive device having a normally closed switch, electrical means for establishing a retarded speed condition whenever said switch is opened, and a second responsive device operable independently of the firstnamed device for terminating such condition and rendered ineffective when said switch is opened, in combination with a control device at each control station of the track including means for operating said second responsive device whenever passing the control station and controlled means for operating the firstnamed responsive device for opening said switch.

7. Vehicle controlling apparatus embodying, in a vehicle equipment, a responsive device including a normally closed switch, electrical means in circuit with said switch to be deenergized whenever said switch is opened for establishing and maintaining a retarded speed condition, and a second responsive device operable independently of the firstnamed responsive device for energizing said electrical means and terminating such condition and rendered ineffective when said switch is opened, in combination with a control device on the track at each control station including means for operating the secondnamed responsive device whenever it passes the control station and controlled means for operating the firstnamed responsive device to open said switch.

8. Vehicle controlling apparatus embodying, in a vehicle equipment, a responsive device including a normally closed switch, electrical means in circuit with said switch to be deenergized whenever said switch is opened for establishing and maintaining a retarded speed condition, and a second responsive device operable independently of the firstnamed responsive device including a normally open switch in circuit with the firstnamed switch and said electrical means for energizing said means and terminating such condition when the secondnamed switch is closed and rendered ineffective when the firstnamed switch is opened, in combination with a controlled device at each control station of the track including means for operating the second responsive device whenever passing the control station and controlled means for operating the firstnamed responsive device.

9. Vehicle controlling apparatus embodying, in a vehicle equipment, a trip member to be tripped from the track, means for establishing a retarded speed condition whenever said member is tripped, a second trip member operable independently of the firstnamed trip member, and means controlled by the second trip member for terminating such condition and rendered ineffective when the firstnamed trip member has been moved from normal position.

10. Vehicle controlling apparatus embodying, in a vehicle equipment, a trip member to be tripped from the track, means for establishing a retarded speed condition whenever said member is tripped, a second trip member operable independently of the firstnamed trip member, and means controlled by the second trip member for terminating such condition and rendered ineffective when the firstnamed trip member has been moved from normal position, in combination with a control device at each control station of the track including a tripping member for tripping the secondnamed trip member whenever passing the control station and a controlled tripping member for tripping the firstnamed trip member.

11. Vehicle controlling apparatus embodying, in a vehicle equipment, a trip member, a normally closed switch operated by said member, electrical means in circuit with said switch to be deenergized whenever said switch is opened for establishing and maintaining a retarded speed condition, a second trip member operable independently of the firstnamed trip member, and a normally open switch operated by the second trip member and connected in circuit with the firstnamed switch and said electrical means for energizing said electrical means when the secondnamed switch is closed and rendered ineffective when the firstnamed switch is opened.

12. Vehicle controlling apparatus embodying, in a vehicle equipment, a trip member, a normally closed switch operated by said member, electrical means in circuit with said switch to be deenergized when said switch is opened for establishing and maintaining a retarded speed condition, a second trip member, and a normally open switch operated by the second trip member and connected in circuit with the firstnamed switch and said electrical means for reenergizing said electrical means when the secondnamed switch is closed with the firstnamed switch closed, in combination with a control device at each control station of the track including a tripping member for tripping the secondnamed trip member whenever passing the control station to close the secondnamed switch, and including a controlled tripping member for tripping the firstnamed trip member to open the firstnamed switch.

13. Vehicle controlling apparatus embodying, in a vehicle equipment, a plurality of trip members, and means controlled by said members for obtaining different vehicle conditions, in combination with a tripping device on the track at each control station including a tripping member operable for tripping one of said trip members whenever passing the control station, for obtaining the corresponding vehicle condition unless one of the other trip members is tripped, said device including other controlled tripping members for tripping said other trip members.

14. Vehicle controlling apparatus embodying, in a vehicle equipment, two trip members, and means controlled by said members for establishing different vehicle conditions when one or both of said members are tripped, in combination with a tripping device at each control station of the track and including a tripping member arranged to trip the firstnamed trip member whenever passing the control station, for establishing the corresponding vehicle condition, said device including a second controlled tripping member for tripping the other trip member.

15. A tripping device including a tripping member, a vehicle carried trip member to be tripped by said tripping member, and actuating means operatively connected under trackside control with said tripping member and having a portion arranged in the path of the wheels of cars travelling on the vehicle track to be moved by said wheels for projecting the tripping member into the path of said trip member.

16. A tripping device including a tripping member, a vehicle-carried trip member to be tripped by said tripping member, and a pair of alternately operable actuating members to be operated in succession by the vehicle carrying said trip member and operatively connected with the tripping member for projecting the tripping member into the path of said trip member and then retracting said tripping member after the trip member has passed the tripping member.

17. A tripping device including a tripping member, a vehicle-carried trip member to be tripped by said tripping member, a pair of actuating members to be operated in succession by the vehicle carrying said trip member, and an operative connection between said actuating and tripping members whereby the tripping member is projected and retracted alternately by the operation of said actuating members in succession to project the tripping member into the path of the trip member and then retract said tripping member after the trip member has passed the tripping member.

18. A tripping device including a tripping member, a vehicle-carried trip member to be tripped by said tripping member, a pair of plungers arranged to be depressed in succession by the vehicle carrying said trip member, and an operative connection between said plungers and tripping member for projecting and retracting the tripping member by the alternate depression of said plungers to project the tripping member into the path of the trip member and then retract said tripping member after the trip member has passed the tripping member.

19. A tripping device including a tripping member, a vehicle-carried trip member to be tripped by said tripping member, vehicle actuated means adapted to be moved by the wheels of a passing vehicle, and a controlled connection between said vehicle actuated means and tripping member to project said tripping member into the path of said trip member by the movement of said vehicle actuated means and arranged for breaking said connection under predetermined conditions to prevent said tripping member being operated by said vehicle actuated means.

20. A tripping device including tripping members for tripping vehicle-carried members, vehicle actuated means, and controlled means for connecting one of the tripping members with the firstnamed means to project said tripping member, the other tripping member being connected with the firstnamed means to be projected whenever the firstnamed means is operated.

21. A tripping device including tripping members for tripping vehicle-carried members, vehicle actuated means, one of said tripping members being connected with said means to be projected and retracted when said means is operated, and electrically controlled means for connecting and disconnecting the other tripping member with reference to the firstnamed means.

22. A tripping device including a tripping member for tripping a vehicle carried member, actuating means arranged to be moved by the wheels of a passing vehicle, and electrically controlled means for connecting, when an electrical circuit is opened, the actuating means and tripping member to project said tripping member when said actuating means is moved by the vehicle wheels.

23. Vehicle controlling apparatus embodying vehicle carried responsive means having a normally closed member and a normally open member, vehicle controlling means controlled by said members to obtain a retarded speed vehicle condition when said normally closed member is opened and to terminate said condition when the normally open member is closed while the normally closed member is closed, and controlling means on the trackway at each control station controlling said responsive means and operable for closing the normally open member whenever it passes a control station and controllable to open the normally closed member.

24. Vehicle controlling apparatus embodying vehicle carried responsive means having a plurality of normally closed members and a normally open member, vehicle controlling means controlled by said members to obtain different retarded speed vehicle conditions when said normally closed members are opened and to terminate said conditions when said normally open member is closed while the normally closed members are closed, and controlling means on the trackway at each controlling station controlling the responsive means and operable for closing the normally open member whenever it passes a control station and controllable to selectively open the normally closed members.

25. Vehicle controlling apparatus embodying vehicle carried responsive means having a normally closed switch and a normally open switch, electrical vehicle controlling means controlled by said switches to obtain a retarded speed vehicle condition when said normally closed switch is opened and to terminate said condition when the normally open switch is closed while the normally closed switch is closed, and controlling means on the trackway at each control station controlling the responsive means and operable for closing the normally open switch whenever it passes a control station and controllable to open the normally closed switch.

26. Vehicle controlling apparatus embodying vehicle carried responsive means having a plurality of normally closed switches and a normally open switch, electrical vehicle control means controlled by said switches to obtain different retarded speed vehicle conditions when said normally closed switches are opened and to terminate said conditions when the normally closed switch is closed while the normally closed switches are closed, and controlling means on the trackway at each control station controlling the responsive means and operable for closing the normally open switch whenever it passes a control station and controllable to selectively open the normally closed switches.

In testimony whereof I hereto affix my signature.

ALFRED L. RUTHVEN.